United States Patent
Koenen

(10) Patent No.: US 12,407,223 B2
(45) Date of Patent: Sep. 2, 2025

(54) ELECTRIC MACHINE AND METHOD FOR OPERATING SAID MACHINE

(71) Applicant: Dr. Ing. h.c. F. Porsche Aktiengesellschaft, Stuttgart (DE)

(72) Inventor: Christian Koenen, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 421 days.

(21) Appl. No.: 18/056,270

(22) Filed: Nov. 17, 2022

(65) Prior Publication Data
US 2023/0163665 A1    May 25, 2023

(30) Foreign Application Priority Data
Nov. 22, 2021 (DE) .......................... 102021130471.7

(51) Int. Cl.
*H02K 9/08* (2006.01)
*H02K 1/20* (2006.01)

(52) U.S. Cl.
CPC .................. *H02K 9/08* (2013.01); *H02K 1/20* (2013.01); *H02K 2209/00* (2013.01)

(58) Field of Classification Search
CPC ........ H02K 9/08; H02K 1/20; H02K 2209/00; H02K 9/197; H02K 3/24; H02K 5/203; H02K 9/19
See application file for complete search history.

(56) References Cited

U.S. PATENT DOCUMENTS

| | | | |
|---|---|---|---|
| 10,784,738 B2 | 9/2020 | Berendes et al. | |
| 2005/0151431 A1 | 7/2005 | Cronin et al. | |
| 2016/0301286 A1* | 10/2016 | Salter | H02K 9/10 |
| 2021/0013755 A1* | 1/2021 | Narita | H02K 1/02 |
| 2021/0218316 A1 | 7/2021 | Ness | |
| 2023/0318370 A1* | 10/2023 | Liu | H02K 5/203 |
| | | | 310/59 |

FOREIGN PATENT DOCUMENTS

| | | |
|---|---|---|
| CN | 1 12 636 499 A | 4/2021 |
| DE | 10 2005 000 642 A1 | 8/2005 |
| DE | 10 2011 056 007 A1 | 6/2012 |
| DE | 10 2016 222 331 A1 | 5/2018 |

(Continued)

*Primary Examiner* — Thomas Truong
(74) *Attorney, Agent, or Firm* — LEYDIG, VOIT & MAYER, LTD.

(57) ABSTRACT

An electric machine, including a rotor having a rotor shaft and a rotor laminated core, a stator having a stator laminated core with recesses and stator windings disposed in the recesses of the stator laminated core, wherein coolant can flow through the recesses such that the stator windings can be directly cooled by the coolant, wherein channels are configured in the stator laminated core at a distance to the recesses such that the stator windings can be indirectly cooled by the coolant flowing through the channels, and a device via which a flow of coolant through the recesses and through the channels can be set depending on an operating point of the electric machine such that, at first operating points, the coolant can be conducted only through the recesses and, at second operating points, the coolant can be conducted at least through the channels.

20 Claims, 2 Drawing Sheets

(56) References Cited

FOREIGN PATENT DOCUMENTS

| | | |
|---|---|---|
| DE | 10 2017 102 141 A1 | 8/2018 |
| DE | 10 2018 222 137 A1 | 6/2020 |
| DE | 10 2019 131 069 A1 | 5/2021 |
| KR | 20100079519 A * | 7/2010 |
| WO | WO 2019/ 238 365 A1 | 12/2019 |

* cited by examiner

ELECTRIC MACHINE AND METHOD FOR OPERATING SAID MACHINE

CROSS REFERENCE TO RELATED APPLICATIONS

This application claims benefit to German Patent Application No. DE 10 2021 130 471.7, filed on Nov. 22, 2021, which is hereby incorporated by reference herein.

FIELD

The invention relates to an electric machine. The invention also relates to a method for operating an electric machine.

BACKGROUND

The basic design of an electric machine is known from practice. An electric machine therefore comprises a stator, which is also referred to as the stand, and a rotor, which is also referred to as the runner.

DE 10 2017 102 141 A1 discloses an electric machine comprising a rotor and a stator. Between the rotor and the stator there is an air gap. Recesses in which stator windings are accommodated are configured in the stator. The stator windings can be cooled via a coolant that flows directly around the stator windings. To prevent the coolant from flowing from the stator in the direction of the stator via the air gap formed between the stator and the rotor, a sleeve-like sealing means is disposed between the stator and the rotor.

DE 10 2019 131 069 A1 discloses another electric machine comprising a rotor and a stator. Recesses that accommodate stator windings are again configured in the stator laminated core of the stator. Channels, through which coolant can flow, are configured in the stator laminated core at a distance to said recesses which accommodate the stator windings. The coolant flowing through these channels does not flow directly around the stator windings. This coolant flowing through the channels rather causes indirect cooling of the stator windings. Between two recesses which accommodate the stator windings and which are adjacent to one another in peripheral direction, there is at least one cooling channel through which coolant flows, which, viewed in peripheral direction, has a defined distance to the recesses which accommodate the stator windings.

DE 10 2011 056 007 A1 discloses another electric machine comprising a rotor and a stator. The stator comprises a stator laminated core with recesses in which stator windings are again disposed. Channels for coolant are moreover configured in the stator laminated core at a distance to said recesses which accommodate the stator windings, specifically at a radial distance.

DE 10 2016 222 331 A1 discloses an electric machine comprising a stator and a rotor, wherein, in addition to the recesses that serve to accommodate stator windings, channels for coolant are configured in the stator laminated core at a distance to said recesses.

DE 10 2005 000 642 A1 and WO 2019 238 365 A1 disclose other electric machines.

There is a need for an electric machine with improved cooling of the stator. There is in particular a need to increase the continuous power density of the electric machine through improved cooling of the stator of the electric machine.

SUMMARY

In an embodiment, the present disclosure provides an electric machine, comprising a rotor comprising a rotor shaft and a rotor laminated core, a stator comprising a stator laminated core with recesses and stator windings disposed in the recesses of the stator laminated core, wherein coolant can flow through the recesses which accommodate the stator windings in such a way that the stator windings can be directly cooled by the coolant, wherein channels are configured in the stator laminated core at a distance to the recesses which accommodate the stator windings through which coolant can flow in such a way that the stator windings can be indirectly cooled by the coolant flowing through the channels, and a device via which a flow of coolant through the recesses which accommodate the stator windings and through the channels can be set depending on an operating point of the electric machine in such a way that, at first operating points, the coolant can be conducted only through the recesses which accommodate the stator windings and, at second operating points, the coolant can be conducted at least through the channels.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
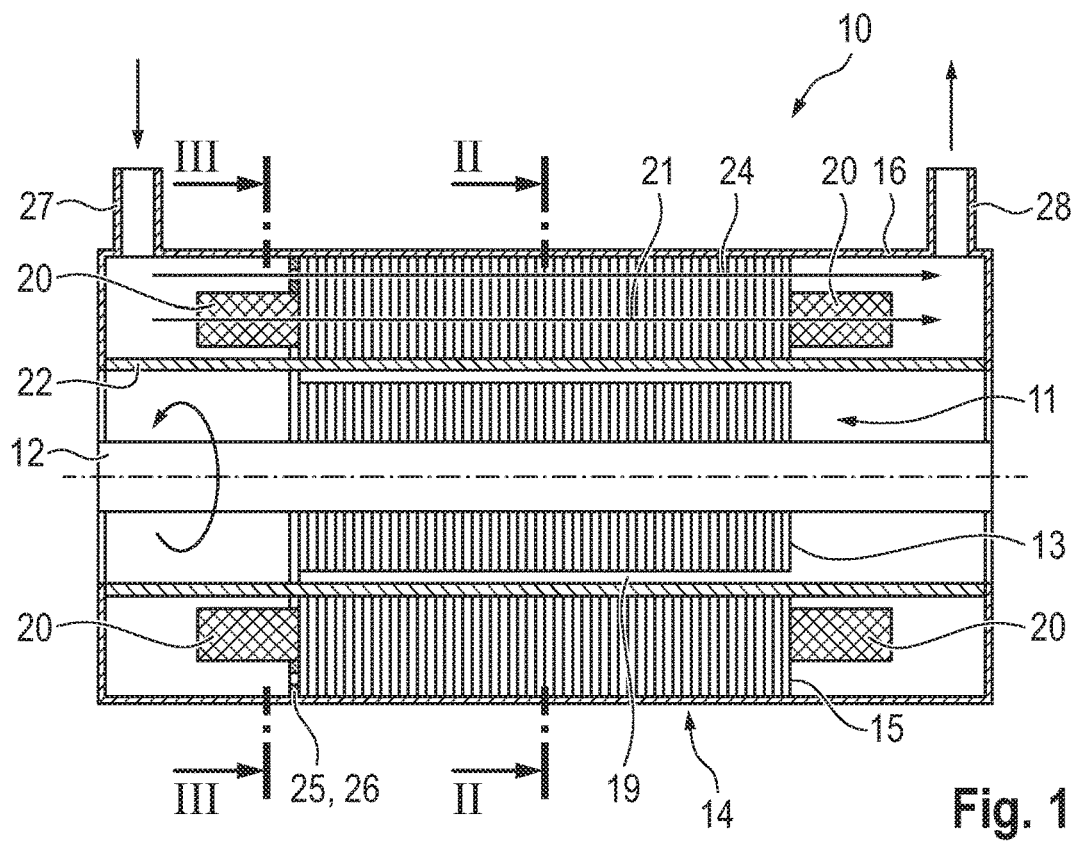
FIG. 1 shows a cross-section through a first electric machine in the axial direction of the section.

In an embodiment, the present invention provides a novel electric machine with improved cooling of the stator and a method for operating the electric machine.

The electric machine according an embodiment of the invention has a rotor comprising a rotor shaft and a rotor laminated core and a stator comprising a stator laminated core with recesses and stator windings disposed in the recesses of the stator laminated core.

Coolant can flow through the recesses which accommodate the stator windings in such a way that the stator windings can be directly cooled by the coolant flowing through said recesses.

Channels are configured in the stator laminated core at a distance to the recesses which accommodate the stator windings through which coolant can flow in such a way that the stator windings can be indirectly cooled by the coolant flowing through said channels.

The electric machine according to an embodiment of the invention further comprises a device via which a flow of coolant through the recesses which accommodate the stator windings and through the channels can be set depending on the operating point of the electric machine in such a way that, at first operating points, the coolant can be conducted only through the recesses which accommodate the stator windings and, at second operating points, the coolant can be conducted at least through the channels.

The electric machine according to an embodiment of the invention uses two different flow paths for the coolant to cool the stator windings of the stator. The coolant can thus be conducted both via the recesses which accommodate the stator windings for direct cooling of the stator windings, and via separate channels for the coolant which are spaced apart from the recesses which accommodate the stator windings for indirect cooling of the stator windings.

In order to define, determine or influence the flow path for the coolant through the recesses which accommodate the stator windings and/or through the channels which are configured in the stator laminated core of the stator at a distance to said recesses, the electric machine comprises the device by means of which the flow of coolant through the recesses and through the channels can be set depending on the operating point of the electric machine.

At first operating points, the coolant flows only through the recesses which accommodate the stator windings. At the second operating points, the coolant can be conducted at least through the coolant channels. This allows particularly effective cooling of the stator of an electric machine and an advantageous increase in the continuous power density.

The first operating points are preferably operating points at which an actual torque of the electric machine at an actual speed of the electric machine is greater than a threshold value. The second operating points are operating points at which the actual torque of the electric machine at the actual speed of the electric machine is less than the threshold value. Therefore, the first operating points are operating points at which the electric machine is operated at relatively high load. These are operating points at which the actual torque provided by the electric machine at the respective actual speed of the electric machine is greater than a threshold value, preferably greater than a defined percentage of the maximum torque that can be provided at said actual speed. The second operating points are operating points with relatively low load, i.e., operating points at which the actual torque provided by the electric machine at the actual speed of the electric machine is less than the threshold value.

According to a first variant of an embodiment of the invention, at the second operating points, a first portion of the coolant can be conducted through the channels and a second portion of the coolant can be conducted through the recesses, wherein the first portion of the coolant is greater than the second portion of the coolant. In this first variant, the device, via which the flow of coolant can be set depending on the operating point of the electric machine, preferably comprises an orifice ring which is capable of being driven in a rotating manner, which blocks the channels at the first operating points and unblocks the channels at the second operating points. The channels and the recesses then preferably use a common coolant inlet and preferably also a common coolant outlet.

This first variant is structurally simple and therefore preferred. In this first variant it is further preferred that, regardless of the respective flow path used for the coolant, the coolant always flows around the winding heads of the stator windings.

The orifice ring is preferably disposed at a coolant flow inlet-side end of the channels. Then, when the orifice ring is disposed at the flow inlet-side end of the channels and blocks the coolant channels at the first operating points, a pressure gradient at the orifice ring causes the channels blocked at the first operating points to be sealed, specifically by pressing the orifice ring against the flow inlet-side end of the stator laminated core.

According to a second variant of an embodiment of the invention, at the second operating points, the coolant can be conducted only through the channels. In this second variant, the device, via which the flow of coolant can be set depending on the operating point of the electric machine, preferably comprises at least one valve which conducts the coolant only via the recesses at the first operating points and conducts the coolant only via the channels at the second operating points. The channels and the recesses then preferably use separate coolant inlets and preferably a common coolant outlet.

The second variant also allows the flow of coolant to be set depending on the operating point. However, since the channels and the recesses use separate coolant inlets in this variant, this variant does not ensure flow around the winding heads of the stator windings at the coolant inlet side end of the stator laminated core at the second operating points.

FIG. 1 shows a schematic cross-section through an electric machine 10. The electric machine 10 comprises a rotor 11, whereby a rotor shaft 12 and a rotor laminated core 13 of the rotor 11 are shown. The electric machine 10 further comprises a stator 14. The stator 14 comprises a stator laminated core 15 and a housing 16. Between the rotor 11 and the stator 14 there is an air gap 19.

Figure 2:
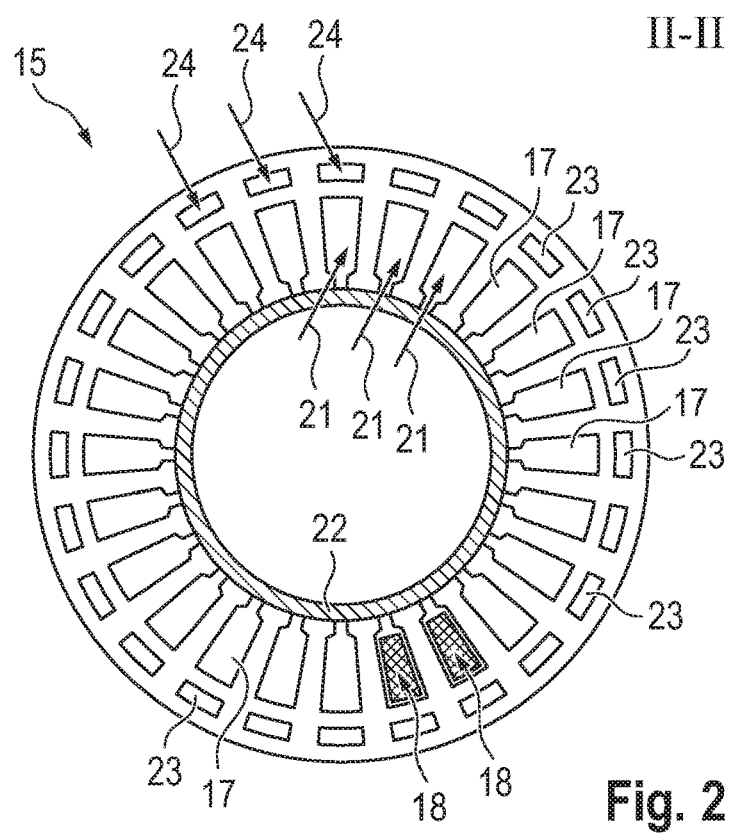
FIG. 2 shows the cross-section II-II of FIG. 1.
Figure 3:
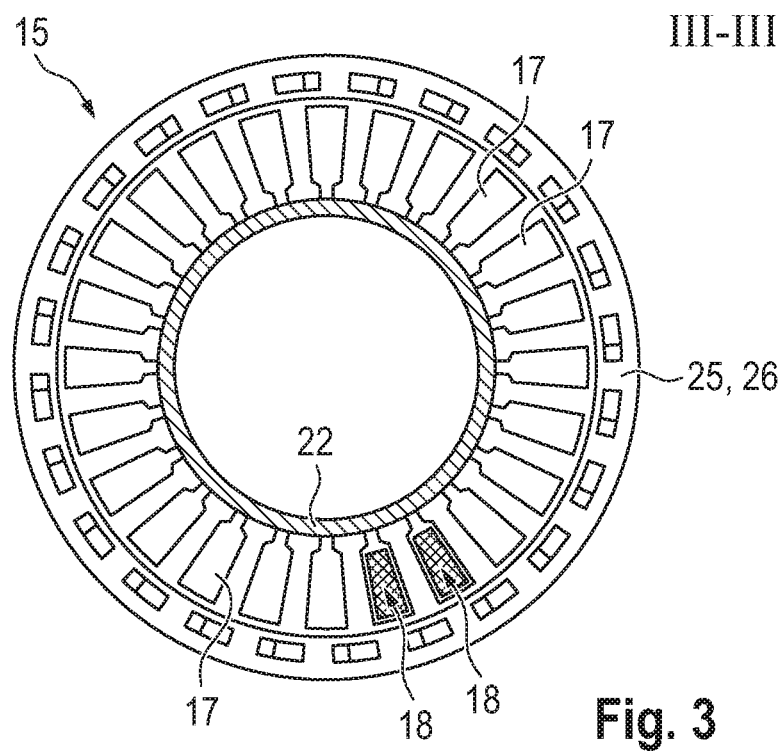
FIG. 3 shows the cross-section III-III of FIG. 1.

The stator laminated core 15 of the stator 14 comprises recesses 17 in which stator windings 18 are disposed. FIGS. 2 and 3 show the stator windings 18 disposed in the recesses 17 for two of the recesses 17. The stator windings 18 project from the stator laminated core 15 at axial ends of said stator laminated core and form winding heads 20 there.

In the electric machine 10, coolant can flow through the recesses 17 which accommodate the stator windings 18 in such a way that the stator windings 18 can be immediately and thus directly cooled by the coolant flowing through the recesses 17. In FIGS. 1 and 2, the flow of coolant through the recesses 17 which accommodate the stator windings 18 is visualized by arrows 21.

To prevent the coolant flowing through the recesses 17 from flowing through the air gap 19 in the direction of the rotor 11, a sleeve-like sealing element 22, which is preferably fixedly connected radially on the inside to the stator laminated core 15, is disposed in the air gap 19. This sleeve-like sealing element 22 extends in axial direction beyond the axial ends of the stator laminated core 15 and consequently also covers the winding heads 20 with respect to the rotor 11.

In addition to the recesses 17 which accommodate the stator windings 18, channels 23 are configured in the stator laminated core 15 at a distance to the recesses 17 which accommodate the stator windings 18, whereby coolant can flow through these channels 23 as well. In FIGS. 1 and 2, the flow of coolant through the channels 23 is visualized by arrows 24, whereby, in the shown design example, the channels 23 are configured in the stator laminated core 15 at a radial distance to the recesses 17, specifically radially on the outside with respect to the recesses 17 in a so-called yoke of the stator laminated core 15. Coolant, which flows through these channels 23 as shown by arrows 24, serves to cool the stator windings 18 indirectly. This coolant flowing through channels 23 therefore does not flow directly around the stator windings 18.

The electric machine 10 comprises a device 25 via which a flow of coolant through the recesses 17 which accommodate the stator windings 18 and through the channels 23 can be set depending on the operating point of the electric machine 10.

This device 25 can be used to set the flow of coolant in such a way that, at first operating points of the electric machine 10, the coolant can be conducted and therefore flows only through the recesses 17 which accommodate the stator windings 18, and, at second operating points of the electric machine 10, the coolant can be conducted and therefore flows at least through the coolant channels 23.

The flow of coolant through the recesses 17 and channels 23 can therefore be set in a defined manner depending on the operating point of the electric machine 10, in order to ensure particularly advantageous cooling of the stator 14 of the electric machine 10 and thus increase the continuous power density of the electric machine 10.

The first operating points of the electric machine 10, in which the coolant flows only through the recesses 17 which accommodate the stator windings 18, are operating points at which an actual torque of the electric machine 10 at an actual speed of the respective operating point of said electric machine is greater than a threshold value, preferably greater than a defined percentage of the maximum torque of the electric machine 10 that can be provided at the actual speed of the respective operating point.

The second operating points of the electric machine 10, in which the coolant can be conducted at least through the coolant channels 23, are operating points of the electric machine 10 at which the actual torque of the electric machine 10 at the actual speed of the respective operating point of said electric machine is less than the threshold value.

The threshold value can, for example, be 75% or 80% of the maximum torque that can be provided by the electric machine 10 at the actual speed of said electric machine.

FIGS. 1 to 3 show a design example of an electric machine 10 in which, at the second operating points, a first portion of the coolant can be conducted through the channels 23 and a second portion of the coolant can be conducted through the recesses 17, whereby the first portion of the coolant which flows through the channels 23 is greater than the second portion of the coolant which flows through the recesses 17. In the design example of FIGS. 1 to 3, the device 25, via which the flow of coolant through the recesses 17 and the channels 23 can be set depending on the operating point of the electric machine 10, comprises an orifice ring 26 which is capable of being driven in a rotating manner.

At the first operating points of the electric machine 10, the orifice ring 26 of the device 25 blocks the channels 23 so that the coolant then flows only through the recesses 17 which accommodate the stator windings 18 at the first operating points of the electric machine 10. At the second operating points, the orifice ring 26 unblocks the channels 23. At these second operating points, the coolant can then flow through both the channels 23 and the recesses 17, whereby however a significantly greater portion of the coolant flows through the channels 23 at the second operating points as a result of the significantly lower flow resistance in the channels 23.

The orifice ring 26 is disposed at a coolant flow inlet-side end of the stator laminated core 15 and thus of the channels 23 configured in the stator laminated core 15. Then, when the orifice ring 26 blocks the channels 23 at the first operating points, said ring is pressed against the end of the stator laminated core 15 as a result of the prevailing pressure gradient, which advantageously seals the channels 23.

In the design example of FIGS. 1 to 3, the recesses 17 which accommodate the stator windings 18 and the channels 23 use both a common coolant inlet 27 and a common coolant outlet 28 configured on the housing 16 of the stator 14.

The design example of FIG. 1 to 3 has the advantage that, regardless of the operating point of the electric machine 10 and thus regardless of the flow path used for the coolant, coolant can always flow around the winding heads 20 which project from the stator laminated core 15 at the axial ends thereof to cool said winding heads 20. This applies in particular to the winding heads 20 which project from the recesses 17 at the coolant flow inlet-side end of the stator laminated core 18 around which cold coolant flows.

Figure 4:
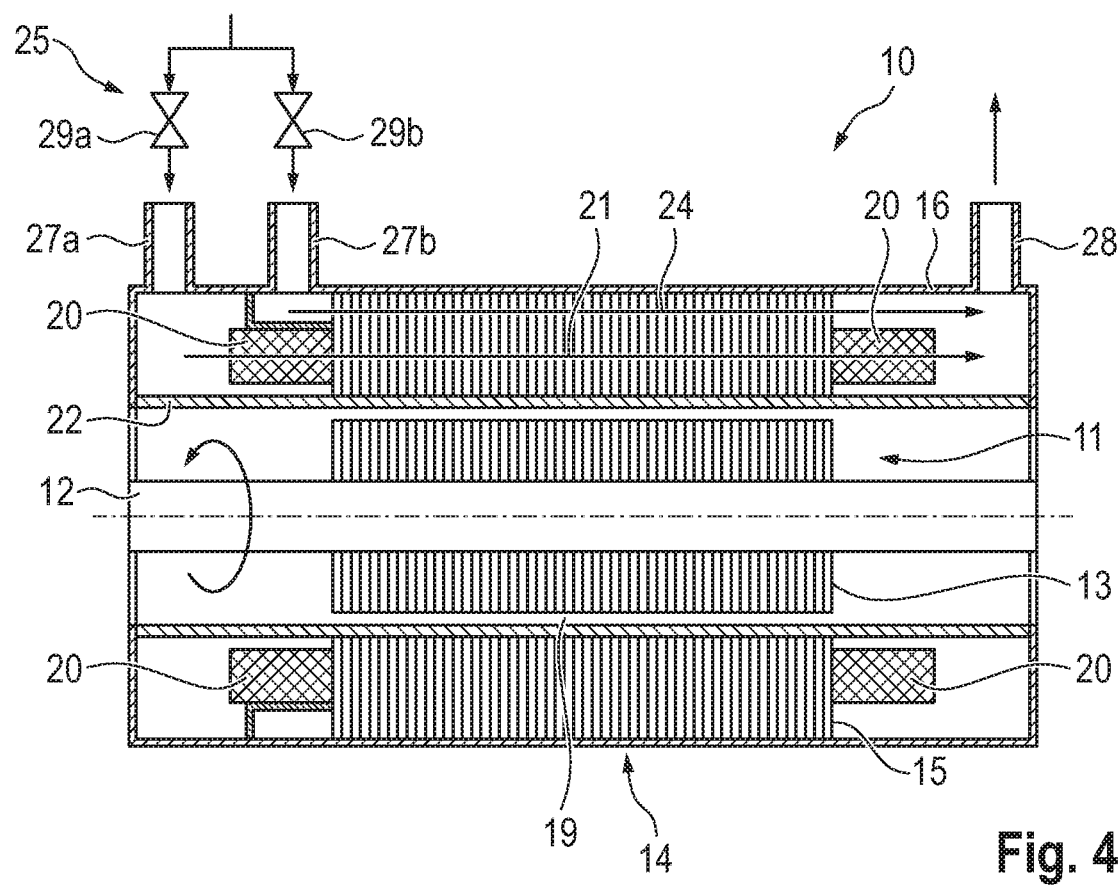
FIG. 4 shows a cross-section through a second electric machine in the axial direction of the section.

FIG. 4 shows a design example of an electric machine 10 according to an embodiment of the invention, in which, at the second operating points of the electric machine 10, the coolant can be conducted only through the channels 23 in the direction of flow 24. In the design example of FIG. 4, the device 25, via which the flow of coolant can be set depending on the operating point of the electric machine 10, comprises at least one valve 29a, 29b. At the first operating points, the valve 29a is open and the valve 29b is closed. At the second operating points of the electric machine 10 of FIG. 4, the valve 29a is closed and the valve 29b is open. In FIG. 4, therefore, at the first operating points, the coolant flows in the direction of flow 21 only through the recesses 17 which accommodate the stator windings 18 and, at the second operating points, the coolant flows in the direction of flow 24 only through the channels 23.

In the design example of FIG. 4, channels 23 and the recesses 17 use separate coolant inlets 27a, 27b. The winding head 20 which projects from the recesses 17 at the coolant flow inlet-side end of the stator laminated core 15 can thus only be cooled in FIG. 4 when the coolant flows through the recesses 17 which accommodate the stator windings 18. However, the winding head 20 which projects from the stator laminated core 15 at the coolant flow outlet-side end can have coolant flowing around it at all operating points.

The electric machine 10 according to an embodiment of the invention thus uses a stator cooling system with different flow paths for the coolant, which are used depending on the operating point of the electric machine 10. The flow of coolant is controlled or influenced via the device 25, preferably via an orifice ring 26 which is capable of being moved in a rotating manner.

At the first operating points of the electric machine 10 with a high load of the electric machine 10, cooling takes place only via direct flow of the coolant around the stator windings 18.

At the second operating points of the electric machine 10 with low load, the coolant flows at least for the most part through the channels 23. Less power is needed for a coolant pump conveying the coolant at the second operating points than at the first operating points, because the pressure loss in the channels 23 is less than in the recesses 17 which accommodate the stator windings 18. The pump output can therefore be reduced at the second operating points and the range of an electric vehicle can thus be increased. Effective cooling at the first operating points can furthermore increase the continuous power density of the electric machine 10 at high load.

In an embodiment, the invention further relates to a method for operating such an electric machine 10. The method provides that, at the first operating points of the electric machine 10, the coolant is conducted only through the recesses 17 which accommodate the stator windings 18 and, at the second operating points of the electric machine 10, the coolant is conducted at least through the channels 23.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electric machine, comprising:
    a rotor comprising a rotor shaft and a rotor laminated core;
    a stator comprising a stator laminated core with recesses and stator windings disposed in the recesses of the stator laminated core,
        wherein coolant can flow through the recesses which accommodate the stator windings in such a way that the stator windings can be directly cooled by the coolant,
        wherein channels are configured in the stator laminated core at a distance to the recesses which accommodate the stator windings through which coolant can flow in such a way that the stator windings can be indirectly cooled by the coolant flowing through the channels; and
    a device via which a flow of coolant through the recesses which accommodate the stator windings and through the channels can be set depending on an operating point of the electric machine in such a way that, at first operating points, the coolant can be conducted only through the recesses which accommodate the stator windings and, at second operating points, the coolant can be conducted at least through the channels,
    wherein:
        the first operating points are operating points at which an actual torque of the electric machine at an actual speed of the electric machine is greater than a threshold value, and
        the second operating points are operating points at which the actual torque of the electric machine at the actual speed of the electric machine is less than the threshold value.

2. The electric machine according to claim 1, wherein, at the second operating points, a first portion of the coolant can be conducted through the channels and a second portion of the coolant can be conducted through the recesses, wherein the first portion of the coolant is greater than the second portion of the coolant.

3. The electric machine according to claim 1, wherein the device, via which the flow of coolant can be set depending on the operating point of the electric machine, comprises an orifice ring which is capable of being driven in a rotating manner, and the orifice ring blocks the channels at the first operating points and unblocks the channels at the second operating points.

4. The electric machine according to claim 3, wherein the orifice ring is disposed at a flow inlet-side end of the stator laminated core and thus of the channels.

5. The electric machine according to claim 4, wherein the channels and the recesses use a common coolant inlet.

6. The electric machine according to claim 5, wherein the channels and the recesses also use a common coolant outlet.

7. The electric machine according to claim 1, wherein, at the second operating points, the coolant can be conducted only through the channels.

8. The electric machine according to claim 7, wherein
    the device, via which the flow of coolant can be set depending on the operating point of the electric machine, comprises at least one valve, and
    the at least one valve conducts the coolant only via the recesses at the first operating points and conducts the coolant only via the channels at the second operating points.

9. The electric machine according to claim 1, wherein the channels and the recesses use separate coolant inlets.

10. The electric machine according to claim 9, wherein the channel and the recesses also use a common coolant outlet.

11. A method for operating the electric machine configured according to claim 1, wherein,
    at the first operating points, the coolant is conducted only through the recesses, and
    at the second operating points, the coolant is conducted at least through the channels.

12. An electric machine, comprising:
    a rotor comprising a rotor shaft and a rotor laminated core;
    a stator comprising a stator laminated core with recesses and stator windings disposed in the recesses of the stator laminated core,
        wherein coolant can flow through the recesses which accommodate the stator windings in such a way that the stator windings can be directly cooled by the coolant,
        wherein channels are configured in the stator laminated core at a distance to the recesses which accommodate the stator windings through which coolant can flow in such a way that the stator windings can be indirectly cooled by the coolant flowing through the channels; and
    a device via which a flow of coolant through the recesses which accommodate the stator windings and through the channels can be set depending on an operating point of the electric machine in such a way that, at first operating points, the coolant can be conducted only through the recesses which accommodate the stator windings and, at second operating points, the coolant can be conducted at least through the channels,
    wherein, at the second operating points, a first portion of the coolant can be conducted through the channels and a second portion of the coolant can be conducted through the recesses, and
    wherein the first portion of the coolant is greater than the second portion of the coolant.

13. The electric machine according to claim 12, wherein
    the first operating points are operating points at which an actual torque of the electric machine at an actual speed of the electric machine is greater than a threshold value, and the second operating points are operating points at which the actual torque of the electric machine at the actual speed of the electric machine is less than the threshold value.

14. The electric machine according to claim 12, wherein the device, via which the flow of coolant can be set depending on the operating point of the electric machine, comprises an orifice ring which is capable of being driven in a rotating manner, and
the orifice ring blocks the channels at the first operating points and unblocks the channels at the second operating points.

15. The electric machine according to claim 12, wherein the channels and the recesses use separate coolant inlets.

16. An electric machine, comprising:
a rotor comprising a rotor shaft and a rotor laminated core;
a stator comprising a stator laminated core with recesses and stator windings disposed in the recesses of the stator laminated core,
wherein coolant can flow through the recesses which accommodate the stator windings in such a way that the stator windings can be directly cooled by the coolant,
wherein channels are configured in the stator laminated core at a distance to the recesses which accommodate the stator windings through which coolant can flow in such a way that the stator windings can be indirectly cooled by the coolant flowing through the channels; and
a device via which a flow of coolant through the recesses which accommodate the stator windings and through the channels can be set depending on an operating point of the electric machine in such a way that, at first operating points, the coolant can be conducted only through the recesses which accommodate the stator windings and, at second operating points, the coolant can be conducted at least through the channels,
wherein:
the device, via which the flow of coolant can be set depending on the operating point of the electric machine, comprises an orifice ring which is capable of being driven in a rotating manner, and
the orifice ring blocks the channels at the first operating points and unblocks the channels at the second operating points.

17. The electric machine according to claim 16, wherein the first operating points are operating points at which an actual torque of the electric machine at an actual speed of the electric machine is greater than a threshold value, and
the second operating points are operating points at which the actual torque of the electric machine at the actual speed of the electric machine is less than the threshold value.

18. The electric machine according to claim 16, wherein, at the second operating points, a first portion of the coolant can be conducted through the channels and a second portion of the coolant can be conducted through the recesses, wherein the first portion of the coolant is greater than the second portion of the coolant.

19. The electric machine according to claim 16, wherein the orifice ring is disposed at a flow inlet-side end of the stator laminated core and thus of the channels.

20. The electric machine according to claim 19, wherein the channels and the recesses use a common coolant inlet.

* * * * *